United States Patent [19]

Sernetz et al.

[11] 3,965,974
[45] June 29, 1976

[54] CONTINUOUS CASTING PLANT

[75] Inventors: Heinz Sernetz; Othmar Pühringer; Rudolf Hoscher, all of Linz, Austria

[73] Assignee: Vereinigte Osterreichische Eisen- und Stahlwerke-Alpine Montan Aktiengesellschaft, Linz, Austria

[22] Filed: Jan. 20, 1975

[21] Appl. No.: 542,682

[30] Foreign Application Priority Data
Jan. 21, 1974 Austria .............................. 460/74
Dec. 23, 1974 Austria ............................ 10268/74

[52] U.S. Cl. ........................... 165/89; 308/76; 308/239; 308/DIG. 8; 432/236; 432/246; 29/116 R
[51] Int. Cl.² ..................... F28D 11/02; F28F 5/02; F27D 3/00
[58] Field of Search .............. 165/87; 29/116 R; 308/DIG. 8, 20, 238–239; 432/236, 246

[56] References Cited
UNITED STATES PATENTS
1,922,039 8/1933 Harris ............................... 432/246
2,696,413 12/1954 Wheildon, Jr. ................. 308/DIG. 8
3,362,815 1/1968 Sikorski ........................... 308/239 X
3,418,028 12/1968 Watson et al. ................. 308/DIG. 8
3,535,006 10/1970 Orkin et al. ..................... 308/238 X Primary Examiner—Charles J. Myhre
Assistant Examiner—Theophil W. Streule, Jr.
Attorney, Agent, or Firm—Brumbaugh, Graves, Donohue & Raymond

[57] ABSTRACT

Continuous casting plant rollers or rolls of small diameter are provided great longitudinal extension, which longitudinal extension exceeds the width of the continuously cast strand. The rollers or rolls have annular recesses distributed over their longitudinal extension, thus forming substantially cylindrical bearing pins to be received in bearings, preferably slide bearings, whose bearing height, measured from the bearing center toward the strand skin, is smaller than the radius of the rollers or rolls. The rollers or rolls may advantageously be composed of a plurality of individual roller or roll bodies held together by at least one bracing anchor. Preferably, the rollers or rolls are provided with internal cooling.

30 Claims, 4 Drawing Figures

CONTINUOUS CASTING PLANT

BACKGROUND OF THE INVENTION

The invention relates to a continuous casting plant having rollers or rolls with small diameters and great longitudinal extensions for supporting, guiding, bending straightening, and deforming a wide continuously cast strand, in particular a steel slab with a width of more than 1000 mm, wherein the length of the rollers or rolls exceeds the width of the strand (the width of the slab).

In continuous steel casting plants, in particular when slabs with a width of 1000 to 2500 mm or more are cast, a plurality of supporting rollers, arranged as close as possible to one another, must be provided below the water-cooled mould, in order to counteract a bulging of the strand skin caused by the ferrostatic pressure of the liquid core of the strand. Practice has shown that such deformations of the strand skin lead to cracks and thus to a deterioration of the quality of the cast product, particularly when rollers with relatively large diameters are used. The problem of supporting the strand skin becomes especially critical when a high casting speed (extraction rate of the strand) is necessary. Such so-called rapid casting plants with a casting speed of more than 1.2 m/min, for instance 1.6 to 2 m/min, require an especially careful construction and maintenance of the whole supporting and guiding roller-construction, since with increasing casting speed the demands for a precise strand support increase, and furthermore, the extraction force for the cast strand rises accordingly.

In modern continuous slab casting plants supporting roll constructions, such as the ones described in detail in German Auslegeschrift No. 1,458,158 and Austrian Pat. No. 290,750, have hitherto been used. With these known constructions, in order to keep the distances between the individual areas of support as small as possible, a plurality of rollers with small diameters is used for each area of support. The rollers are secured to a common, non-rotatable axis, one behind the other, in such a way that support members or axis holders, engage between the individual rollers. The support members or axis holders, in turn, are supported either on curved longitudinal carriers or on backing beams of a stationary frame construction. By supporting the stationary roller axis in a number of places, undue bending is prevented, and thus a much costlier construction is avoided, such as, for instance, the one described in U.S. Pat. No. 3,283,368. In this reference a solution to the problem of the bending of the thin and long supporting rollers is described in which, on the one hand, behind the stationarily mounted supporting rollers below the mould, further supporting rollers of wider diameters engage the thin rollers or that on the other hand the thin supporting rollers, are arranged at their ends in endless traveling chains so that the supporting rollers moving with the strand are, in turn, supported in or ride on a stationary path consisting of tracks arranged next to one another.

The following disadvantages are common to all these known supporting roller constructions, thus limiting their use in rapid slab casting plants:

a. By using a great number of roller bodies next to one another on a common axis, an extremely high number of bearings becomes necessary, and thus the disorder susceptibility of such a construction is correspondingly high, since supplying the bearing areas with lubricant is difficult and cannot be easily controlled.

b. Special cooling of the bearings — in a closed cooling circuit — is possible only at great expense due to the construction and — in an open circuit — the cooling agent can also reach the strand skin in undesired areas of the continuous casting machine.

c. The rollers, in particular rollers formed by roller bodies lying next to one another and having diameters of about 175 mm, for reasons of construction, cannot be provided with internal cooling, as has been suggested per se and has been known from German Pat. No. 1,908,763, but rather external cooling by means of spraying nozzles, being mainly provided for uniform cooling of the strand skin and adjusted accordingly, has to be employed. This has the grave disadvantage that, when the spraying nozzles are out of order — for instance when they are clogged by impurities which may be contained in the cooling water due to insufficient maintenance of the water supply system — there is the danger of overheating. For instance, in the case of such disorders in the external cooling system of the rollers, temperatures of about 700°C were measured in the bearing elements, which at first caused the bearing grease to coke, then blocked the bearing, and finally deformed and bent the rollers. In extreme cases the extraction force may increase so enormously that the strand cracks and liquid steel flows out under very high pressure.

d. The roller bodies, arranged next to one another, cannot be driven for reasons of construction, and therefore the above mentioned friction resistance that increases with the casting speed (which has to be opposed by a greater extraction force) cannot be counteracted. Thus in all the known supporting roller constructions, the roller bodies are without a drive (see German Auslegeschrift No. 1,816,179, German Offenlegungsschrift No. 1,458,032 and U.S. Pat. No. 3,268,956). Since the solidifying strand does not shrink uniformly, it may happen that, for instance, lateral rollers on the edges of the strand no longer contact the surface of the strand and come to a stand-still. In this case they are heated up on one side very quickly and are destroyed. But, it may also happen that on the lower side of the strand, scales build up on the spraying nozzles and thus individual rollers become blocked and spans are scraped off the strand skin as it slides over the rollers.

e. Since the thin rollers cannot be driven, the extraction forces for the strand have to be applied by means of special driving stands whose rolls usually have diameters of about 500 mm. Since, especially in high capacity plants, the strand skin is very thin, it is desirable to apply the drawing forces to the strand skin as carefully as possible and to distributed them over the length of the strand. When a number of driving stands are arranged at distances between the non-driven supporting rollers of the above kind, there is the danger of an impermissible elongation of the strand skin and the formation of cracks in the transition areas, especially at increasing casting speeds. Therefore, it has hitherto been impossible to build a continuous casting machine, without providing for a highly complex construction, in which from the mould to the end of the area where the strand has a liquid core, only rollers with small diameters are used, wherein each individual roller can be used for extracting the strand, i.e. it can be driven.

SUMMARY OF THE INVENTION

It is the object of the invention to overcome these disadvantages and to create a continuous casting plant of the above mentioned kind, which operates with greater safety, has an improved bearing construction with a reduced number of bearings and bearing places and whose rollers are easy to produce, easy to take care of and can be exchanged quickly. It is a further object of the invention to enable the use of such rollers or rolls also in places where the external cooling of the strand is either not uniform or no longer present at all. The useful life of the rollers is to be essentially increased; at the same time it is attempted to reduce the extraction force to be applied to the strand so that damage to the cast strand is impossible.

These objects of the invention are achieved in that the rollers and rolls, have, distributed over their longitudinal extensions, a number of annular recesses, whereby relatively narrow, substantially cylindrical bearing pins are formed. These pins are arranged in bearings, whose bearing height — measured from the bearing center towards the strand skin — is smaller than the radius of the rollers or rolls. Also, the bearings are supported against a stationary supporting construction.

A preferred embodiment of the invention is characterised in that the rollers or rolls are comprised of equal, interchangeable roller or roll bodies having one annular recess each and that the individual roller or roll bodies of a roller or roll are held together by one or more bracing anchors. These roller or rolls, which are assembled of equal roller or roll bodies, have the advantage that only the interior roller bodies, which are more worn during the casting of narrower slabs, have to be renewed, and a renewal of the whole roller is not necessary. Furthermore, the production of the rollers, due to the reduced length of the blank of the roller body is less complex and more economical. A further advantage of the rollers comprised of roller bodies is that complete rollers do not have to be stored; but, only the number of roller bodies that corresponds to the wear have to be stored.

It is advantageous to provide the roller or roll bodies, for centering purposes, with a central recess on one front side and with a projection fitting into such recess on the other side.

A further preferred embodiment of the invention is characterised in that the rollers or rolls have an internal cooling.

Advantageously, the internal cooling of a roller is formed by a coolant passage pipe concentrically arranged in an axial bore of the rollers or rolls and having a smaller diameter. The bore is closed at one end and the pipe ends at a distance from the closed part. At the other end a rotatable connection is provided for the cooling water supply and drain conduits.

In rollers or rolls formed by equal roller or roll bodies the bracing anchor preferably takes the form of a pipe and is used for supplying the coolant.

According to a further feature of the invention the rollers or rolls can be directly driven, for instance by a driving motor that can be slipped on or flanged to an end of the roller or roll. Preferably a hydraulic motor is used which, in turn, is coupled to an intermediate gear and is secured by a torque support relative to the supporting construction in the peripheral direction. Of course it is also possible to commonly drive a plurality of rollers or rolls in a manner known per se, e.g. by a chain drive. The individual drive has, however, the great advantage that the rollers can be easily taken out in case of repair, and there are no problems regarding the accommodation of the drive. It has been found that the external diameter of the hydraulic motors to be slipped onto the roller pins together with their intermediate gears need not be much wider than the external diameter of the rollers or rolls themselves, so that the drive can easily be accommodated on one side. If desired, the drive can be arranged on the left-hand side for one roller and on the right-hand side for the next roller, or the rollers can alternately have ends of differing lengths (pins), so that the drives are staggered and can be more easily accommodated on one side. With individual drives, measuring means for controlling the current intake can also be provided, so that, when electromotors are used, a control of the functioning of the bearing is possible.

Slide as well as ball and roller bearings of known construction and design can be used as bearings for the roller of the invention. In a preferred embodiment of the invention the bearings are constructed as slide bearings, wherein preferably, on the side facing away from the cast strand, bearing half-shells and, on the side facing the cast strand, bearing lids with a wider interior diameter than the diameter of the bearing pins are provided for the formation of a heat-insulating gap.

Preferably, the bearing lid is made of a material with poor thermal conductivity, e.g. a chromium-nickel steel, a ceramic or metal-ceramic material, or it can be provided with a coating or cladding of an insulating material.

The rollers or rolls shall have, at least in the area of their bearing pins, a hard, ground surface produced by spraying on hard metals or hard chrome plating followed by grinding.

Accordingly, a material with high heat and wear resistance is used according to the invention for the bearing half-shells, whose hardness is less than that of the surface of the bearing pins, for instance multimaterial aluminum bronzes, such as Mn-Al-bronzes, or sintering metals.

Furthermore, the bearing half-shells shall have bores for supplying a lubricant and/or coolant and/or hydrostatic carrying agent.

BRIEF DESCRIPTION OF THE DRAWINGS

The invention will now be described in more detail by way of three examples with reference to the drawings in which.

DESCRIPTION OF EXEMPLARY EMBODIMENTS

Figure 1:
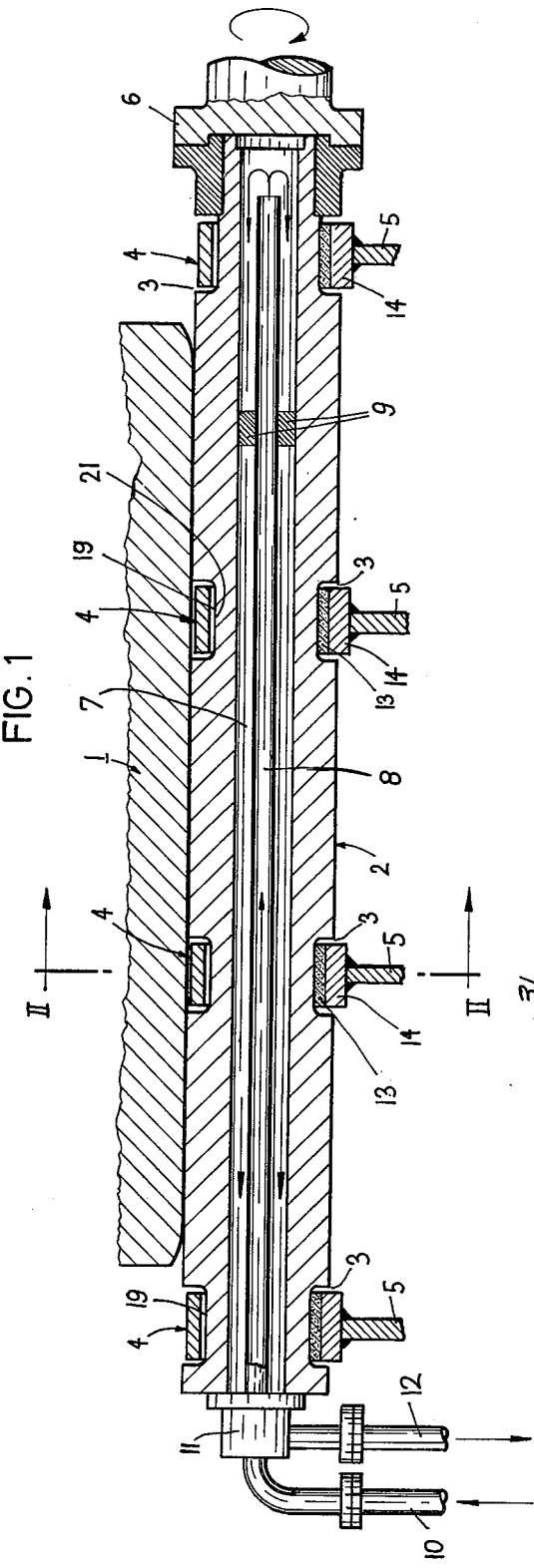
FIG. 1 is a longitudinal section of a roller or roll according to the invention, comprised of one piece, which roller is arranged below a continuously cast slab.
Figure 2:
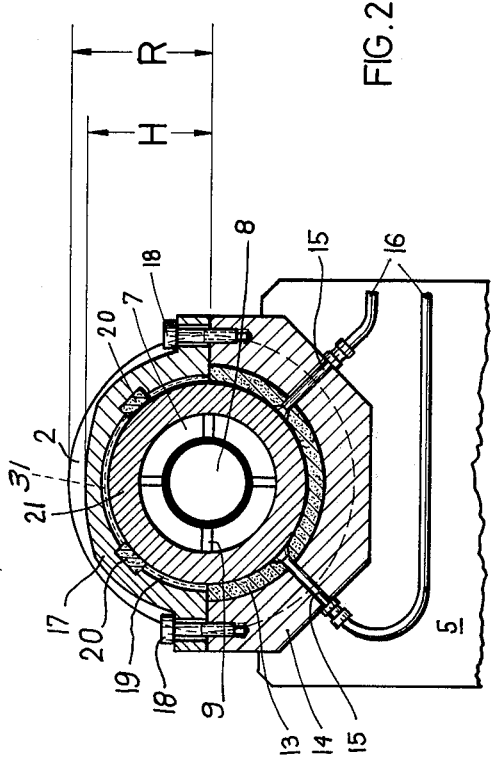
FIG. 2 is — on an enlarged scale — a section along line II—II of FIG. 1.

In FIG. 1 a continuously cast slab 1 rests on a roller or roll 2 and its strand skin is supported by the roller. According to the invention the roller, which may have a diameter of about 175 mm or less and a length of at least 1000 to about 3000 mm, has two or more areas of support between the bearings at the roller ends for preventing an impermissible bending. All of the bearings are formed by recesses 3. In these recesses 3 a cylindrical surface is produced, for instance by hard chrome plating or spraying on of metals followed by grinding, which surface is surrounded by a bearing. This bearing as a whole is denoted with 4 is shown in FIG. 2 in detail. The bearing height H — taken from the roller axis towards the strand 1 — is somewhat less than the radius R of the roller. Each bearing has a supporting construction 5 which, in turn, is connected with a supporting beam or with curved longitudinal carriers, such as those described in the above mentioned German Auslegeschrift No. 1,458,158 and Austrian Pat. No. 290,750. This supporting beam or these curved longitudinal carriers therefore are not shown. These construction elements can be detachably secured as a whole to the supporting construction of the continuous casting plant, so that the removal and the installation of such a roller can be carried out quickly and easily. Furthermore — as known per se — springs can be provided between the individual supporting elements. It is also possible for each bearing support 5 to be connected with the respective supporting beam or curved longitudinal carrier by means of a wedge connection (not shown), and also a hydraulic mounting is possible, which — as is known per se — has the advantage that each roller can be adjusted individually to the strand 1 with a certain pressure. Reference number 6 denotes a drive flange, to which a hydraulic motor (not shown) with an integrally connected intermediate gear is detachably secured. The drive is secured by a torque support in the peripheral direction relative to the supporting construction.

The new bearing construction according to FIG. 2 comprises the following essential characteristics: On the side of the roller facing away from the strand 1, which is the lower side in the drawing, only one bearing half-shell 13 need be provided. The bearing half-shell 13 is secured to a pillow block 14, and the pillow block 14 is in fixed or detachable connection with the support 5. Reference number 15 denote bores for supplying either a lubricant or, possibly, a coolant. In other bearing embodiments a hydrostatic carrying agent can also be introduced. Reference number 16 denotes the appertaining lubricant conduits. The bearing lid 17, which is secured to the pillow block 14 by means of screws 18 according to this embodiment, only serves as a seal and between it and the bearing pin 21 a gap (play) 19 is provided, thus formed a heat-curbing gap. As has been said before, the bearing lid can also be made of a heat-insulating material or covered with an insulating material 31 in order to further reduce the heat radiation and the influence of the slab surface. Reference number 20 denotes spacing members which only serve to accommodate the weight of the roller or roll 2, if the latter is arranged above the slab 1 — which means hanging.

Figure 3:
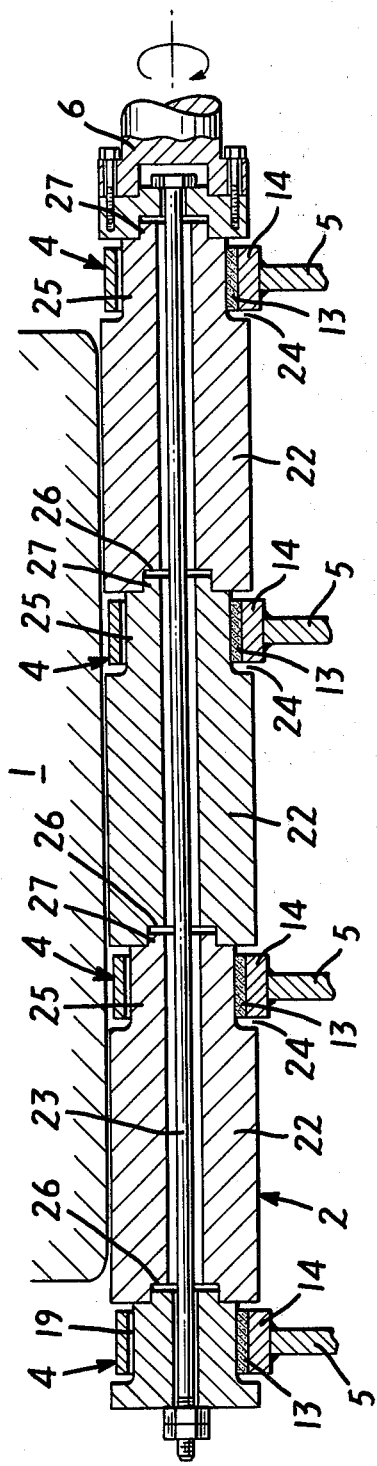
FIG. 3 shows a longitudinal section through a roller or roll comprised of equal, interchangeable roller or roll-bodies

In rollers comprised of equal, interchangeable roller bodies 22 (FIGS. 3 and 4), the roller bodies 22 are held together by the bracing anchor 23. Each one of the roller bodies at one end is provided with an annular recess 24 for the formation of bearing pins 25. The mutual centering of the roll bodies is achieved by means of central recesses 26 on the one front side and projections 27 fitting into these recesses on the opposite side of the roll bodies.

The internal cooling for a one piece roll or roller (FIGS. 1 and 2) is effected in that a water passage pipe 8 is inserted into an axial bore 7 of the roller 2 and centering ribs 9 are provided; thereby an annular space is formed through which the cooling water — supplied by the pipe 10 — passes in the direction of the arrow through the roller and flows out through the pipe 12. Reference number 11 denotes a rotatable link or a rotatable connection known per se. It is also possible to introduce the cooling water on the left-hand side in the drawing and to let it flow out on the right-hand side. In such a case the water passage pipe 8 could be left out and the inner bore 7 could have an even smaller diameter. The advantage of the inner cooling system is that in the area of the bearings 4, the bearing pins 21 of the roller 2 are relatively thin and thus the cooling effect is especially strong.

Figure 4:
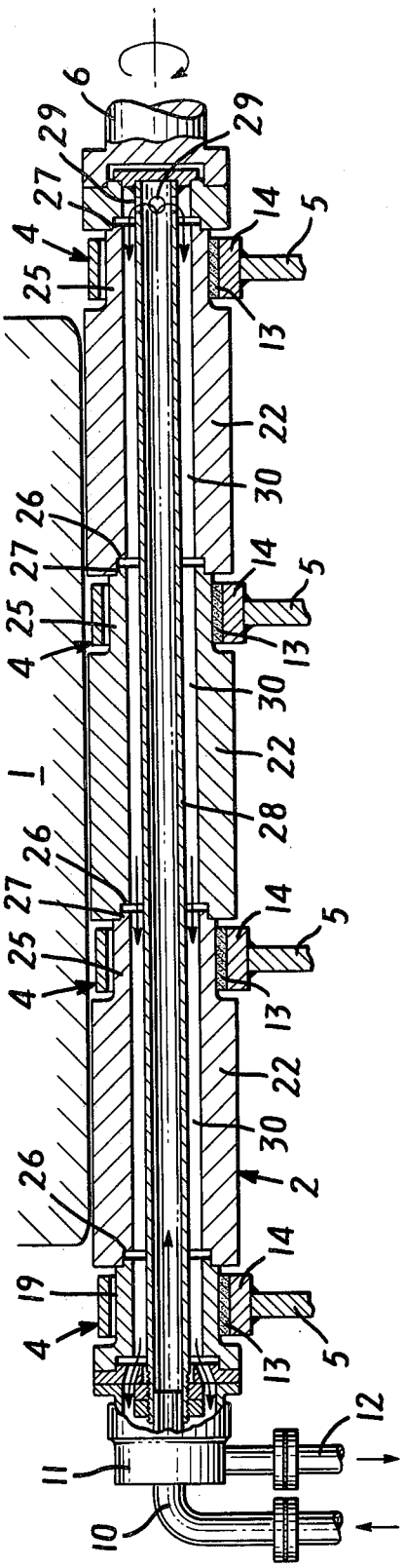
FIG. 4 is a longitudinal section through such a roller, which is provided with an internal cooling.

According to FIG. 4, the internal cooling of a roller comprised of roller bodies according to the invention is effected by means of a bracing anchor 28 having the form of a pipe, which anchor serves for supplying the coolant. The bracing anchor is concentrically arranged in the axial internal bores 30 of the roller bodies 22 and has bores or holes 29 through which the cooling water that is supplied and drained by the rotatable link 11, flows into the internal bores 30 of the roller bodies.

What we claim is:
1. A roller or roll assembly for supporting, guiding, bending, straightening or deforming a continuously cast strand of relatively great width, for example a steel slab, in a continuous casting plant having a supporting structure, said roller or roll assembly comprising:
   a roller or roll having a small diameter and a great longitudinal extension exceeding the width of the continuously cast strand, annular recesses being distributed over the longitudinal extension of the roller or roll to form relatively narrow bearing pins of substantially cylindrical shape; and
   bearings surrounding and accommodating said bearing pins, said bearings having a height, measured from their center in the direction toward the strand, that is smaller than the radius of the roller or roll, said bearings being supported against the supporting structure of the continuous casting plant.

2. A roller or roll assembly as set forth in claim 1, wherein the roller or roll is formed by equal and interchangeable roller or roll bodies having an annular recess each and wherein at least one bracing anchor is provided for holding together the individual roller or roll bodies.

3. A roller or roll assembly as set forth in claim 2, wherein, for centering said roller or roll bodies, a central recess is provided in each roller or roll body at one end thereof and a projection fitting in such a recess is provided at its opposite end.

4. A roller or roll assembly as set forth in claim 1, wherein said roller or roll further includes an internal cooling.

5. A roller or roll assembly as set forth in claim 1, further comprising: an axial bore in said roller or roll; a coolant passage pipe having a smaller diameter than said bore and being concentrically arranged in said bore to provide for an inner cooling of said roller or roll, the bore having a closed portion at one end thereof and the coolant passage pipe ending at a distance from said closed portion; and a rotatable connection element for coolant supply- and drain-conduits being arranged opposite said closed portion.

6. A roller or roll assembly as set forth in claim 2, wherein the at least one bracing anchor is designed as a pipe for supplying coolant, thus providing for internal cooling.

7. A roller or roll assembly as set forth in claim 1, further comprising means for directly driving said roller or roll.

8. A roller or roll assembly as set forth in claim 7, wherein said means for directly driving said roller or roll comprises a driving motor arranged at one end of said roller or roll, which motor is coupled to an intermediate gear, and a torque support provided for peripherally securing said motor relative to the supporting structure of the continuous casting plant.

9. A roller or roll assembly as set forth in claim 8, wherein said driving motor is slippable onto one end of said roller or roll.

10. A roller or roll assembly as set forth in claim 8, wherein said driving motor is flangeable to one end of said roller or roll.

11. A roller or roll assembly as set forth in claim 8, wherein said driving motor is a hydraulic motor.

12. A roller or roll assembly as set forth in claim 1, wherein said bearings are slide bearings.

13. A roller or roll assembly as set forth in claim 1, wherein said bearings are slide bearings, each comprising a bearing half-shell arranged to face away from the cast strand and a bearing lid arranged to face the cast strand, said bearing lid having an interior diameter so dimensioned that a heat-insulating gap forms between said bearing lid and the bearing pin.

14. A roller or roll assembly as set forth in claim 13, wherein the bearing lid is comprised of a material with poor thermal conductivity.

15. A roller or roll assembly as set forth in claim 13, wherein the bearing lid is comprised of chromium-nickel steel.

16. A roller or roll assembly as set forth in claim 13, wherein the bearing lid is comprised of a ceramic material.

17. A roller or roll assembly as set forth in claim 13, wherein the bearing lid is comprised of a metal-ceramic material.

18. A roller or roll assembly as set forth in claim 13, wherein the bearing lid is coated with an insulating material.

19. A roller or roll assembly as set forth in claim 13, wherein the bearing lid is clad with an insulating material.

20. A roller or roll assembly as set forth in claim 13, wherein said roller or roll has, at least in the area of the bearing pins thereof, a hard, ground surface.

21. A roller or roll assembly as set forth in claim 20, wherein said hard, ground surface is sprayed on hard metals that have been grounded.

22. A roller or roll assembly as set forth in claim 20, wherein said hard, ground surface is hard chrome plating that has been ground.

23. A roller or roll assembly as set forth in claim 13, wherein the bearing half-shells are comprised of a material with high thermal and wear resistance, said material being less hard than the surface of the bearing pins.

24. A roller or roll assembly as set forth in claim 23, wherein said material is a multi-material aluminum bronze.

25. A roller or roll assembly as set forth in claim 24, wherein said multi-material aluminum bronze is a Mn-Al-bronze.

26. A roller or roll assembly as set forth in claim 23, wherein said material is a sintering metal.

27. A roller or roll assembly as set forth in claim 13, wherein said bearing half-shells have bores.

28. A roller or roll assembly as set forth in claim 27, further comprising lubricant supply means connected to said bores.

29. A roller or roll assembly as set forth in claim 27, further comprising coolant supply means connected to said bores.

30. A roller or roll assembly as set forth in claim 27, further comprising hydrostatic carrying agent supply means connected to said bores.

* * * * *